UNITED STATES PATENT OFFICE.

JEAN LOUIS ALPHONSE PARÉ, OF MONTREAL, QUEBEC, CANADA.

ALIMENTARY PRODUCT.

1,128,357.     Specification of Letters Patent.     Patented Feb. 16, 1915.

No Drawing.     Application filed April 3, 1914. Serial No. 829,354.

*To all whom it may concern:*

Be it known that I, JEAN LOUIS ALPHONSE PARÉ, a subject of the King of Great Britain, and residing at the city of Montreal, in the Province of Quebec, in the Dominion of Canada, have invented certain new and useful Improvements in Alimentary Products; and I do hereby declare that the following is a full, clear, and exact description of the same.

The invention relates to an alimentary product which can be used for sandwiches and in some of its forms in place of butter for general table use.

The alimentary product according to the invention consists essentially of a mixture of fat with a comparatively small quantity of an ingredient whose nature is to neutralize the disagreeable taste of the fat. To this mixture is or are added condiments and a flavoring or flavorings of any kind. The result is a greasy product something like butter, but a different odor and taste.

The fat I prefer to use is lard for it is recognized that hog's lard and compound lard are digestible and assimilable, but on account of the objectionable taste would never become popular for table use. Now the taste neutralizing ingredient above mentioned, though in a much smaller quantity than the fat, performs the function of neutralizing or removing the objectionable greasy taste of the lard. Flour is excellent for the purpose, but mashed potatoes, pulverized fish, cheese, nuts, fruits, etc., would answer the purpose. Having now a mixture of fat and a taste neutralizing ingredient, these two are mixed together while the fat is in a melted state and a flavoring or flavorings is, or are, added to give the desired taste to the product (the disagreeable taste having been removed as before mentioned). For example, a quantity of meat extract while giving the desired flavor improves the nourishing qualities of the product; but, with the meat extract flavoring, may also be included a small quantity of garlic and the whole allowed to cool and set.

To preserve the consistency of the product, I may use a small quantity of gelatin or the like and to cheapen the product, it may be diluted with a nourishing ingredient such as milk.

It must be particularly understood that the essential feature of the invention is the ingredient to neutralize the taste of the lard or to change its disagreeable taste into a good one, and, it is obvious, that the ingredient for this purpose, may be of such a nature as to increase the nourishing qualities of the product. Condiments, while not absolutely necessary, are used by preference and the flavoring injects into the product the necessary taste. As an example of the proportions of the fat to the taste neutralizing ingredient, I may state that when flour is used there would be about four parts of flour to twelve parts of lard, while the quantities of flavoring and condiments would of course be very small.

The product according to the invention is very nourishing, cheaper than butter and can be made in many attractive flavors.

What I claim is:—

1. An alimentary product of a greasy nature for table use, containing a mixture of a fatty substance and an ingredient to change the disagreeable taste of the fatty substance, the said ingredient being in such a relatively small quantity as to retain a buttery consistency in the product, flavoring being also used to impart the desired taste to the product.

2. An alimentary product of a greasy nature for table use, containing a mixture of a fatty substance, a food ingredient of a nature to change the disagreeable taste of the fatty substance, the said ingredient being in such a relatively small quantity as to retain a buttery consistency in the product, and a flavoring ingredient to impart the desired taste to the product.

3. An alimentary product of a greasy nature for table use, comprising a fatty substance, a taste neutralizing ingredient in such a relatively small quantity that will result in a buttery consistency of the product, flavorings to impart the desired flavor to the product, and condiments.

Signed at Montreal, Quebec, Canada, this 2nd day of April 1914.

JEAN LOUIS ALPHONSE PARÉ.

Witnesses:
   C. PATENAUDE,
   M. PATENAUDE.